(12) United States Patent
Schwartz et al.

(10) Patent No.: US 6,209,009 B1
(45) Date of Patent: Mar. 27, 2001

(54) METHOD FOR DISPLAYING SELECTABLE AND NON-SELECTABLE ELEMENTS ON A SMALL SCREEN

(75) Inventors: Bruce V. Schwartz, San Mateo; Alain S. Rossmann, Palo Alto, both of CA (US)

(73) Assignee: Phone.com, Inc., Redwood City, CA (US)

( * ) Notice: Subject to any disclaimer, the term of this patent is extended or adjusted under 35 U.S.C. 154(b) by 0 days.

(21) Appl. No.: 09/057,164

(22) Filed: Apr. 7, 1998

(51) Int. Cl.[7] ..................................................... G09G 5/34
(52) U.S. Cl. ........................ 707/517; 707/518; 707/519; 707/526
(58) Field of Search ................................. 707/518, 519, 707/526; 345/340, 341, 342, 123, 124; 717/505, 509, 520, 529

(56) References Cited

U.S. PATENT DOCUMENTS

| | | | |
|---|---|---|---|
| 4,309,700 | 1/1982 | Kraemer | 345/123 |
| 4,377,852 | 3/1983 | Thompson | 710/47 |
| 4,412,294 | 10/1983 | Watts et al. | 345/123 |
| 4,642,789 | 2/1987 | Lavelle | 345/192 |
| 4,814,757 | 3/1989 | Patterson et al. | 345/124 |
| 4,873,514 | 10/1989 | Nakagawa et al. | 345/124 |
| 4,952,927 | 8/1990 | DeLuca et al. | 345/124 |
| 5,175,813 | 12/1992 | Golding et al. | 345/340 |
| 5,321,750 * | 6/1994 | Nadan | 380/20 |
| 5,321,804 | 6/1994 | Kusaba et al. | 345/341 |
| 5,528,260 * | 6/1996 | Kent | 345/123 |
| 5,677,708 | 10/1997 | Matthews, III et al. | 345/123 |
| 5,749,082 | 5/1998 | Sasaki | 345/124 |
| 5,801,677 | 9/1998 | Obata | 345/123 |
| 5,825,349 * | 10/1998 | Meier et al. | 345/123 |
| 5,867,158 * | 2/1999 | Murasaki et al. | 345/123 |
| 5,874,936 * | 2/1999 | Berstis et al. | 345/123 |

FOREIGN PATENT DOCUMENTS

| | | | |
|---|---|---|---|
| 0 275 165 | 7/1988 | (EP) | G08B/5/22 |
| 0 864 963 | 9/1997 | (EP) | G06F/3/033 |
| 59 057338 | 4/1984 | (JP) | G06F/3/14 |
| WO 89/01211 | 2/1989 | (WO) | G08B/5/22 |
| Wo 96/27968 | 9/1996 | (WO) | H04M/1/00 |
| WO 97/31361 | 8/1997 | (WO) | G09G/3/20 |
| WO 98/29797 | 9/1998 | (WO) | G06F/3/100 |

OTHER PUBLICATIONS

Laura Lemay's Workshop (Microsoft FrontPage 97), Sams.net Publishing, Jan. 1997, p. 316, 678, 681.*

"Method for Defining Pane Attributes for Scrolling" Research Disclosure, No. 288, Apr. 1, 1988, p. 192 XP000052212.

* cited by examiner

*Primary Examiner*—Wayne Amsbury
*Assistant Examiner*—Thuy Do
(74) *Attorney, Agent, or Firm*—Joe Zheng; Alan D. M.

(57) ABSTRACT

A structured screen display process presents structured information that includes a plurality of selectable and non-selectable elements on any width screen display so that the user is able to see as many of the elements as possible at once, and is able to see the complete text of any element as needed. The process dynamically adapts the display of structured information to the screen display width of a device. The structured information is presented on a screen display by displaying at least a portion of each element of a plurality of elements on the screen display where at least one of the selectable elements has a width greater than a width of the screen display. The at least one selectable element is scrolled horizontally while continuing to display the other elements of the plurality of elements.

37 Claims, 8 Drawing Sheets

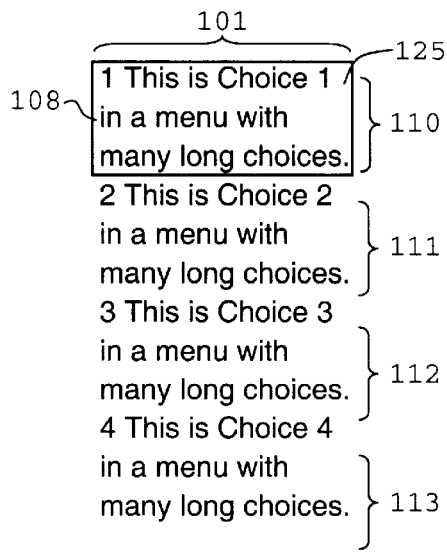
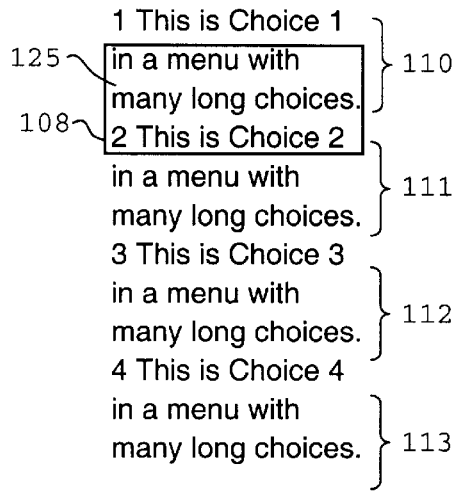
*Fig. 1A (Prior Art)*　　　*Fig. 1B (Prior Art)*
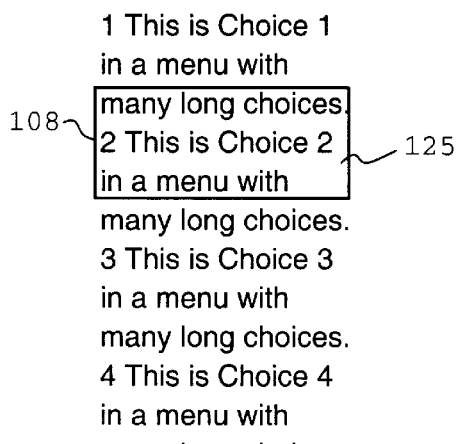
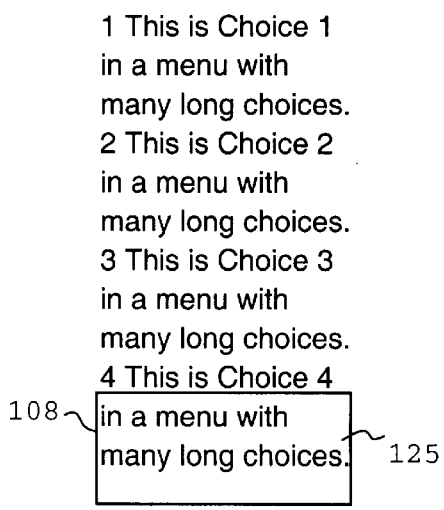
*Fig. 1C (Prior Art)*　　　*Fig. 1D (Prior Art)*
108 — 1 Choice 1, This a menu with many long choices ... 4 Choice 4, This a menu with many long choices.
*Fig. 2 (Prior Art)*

402 — Note: ABC Info Site has added a new link to world financial news.
404 — 1. US News
406 — 2. World News
408 — 3. Financial News
410 — Dow hit 10,000
412 — 4. Weather
414 — 5. Traffic
416 — 2499 units left

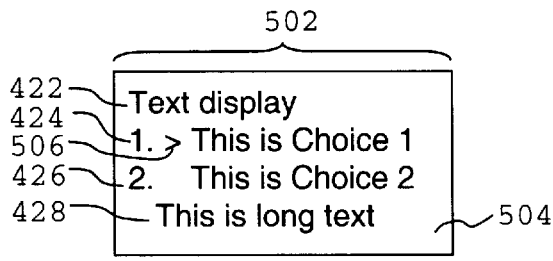
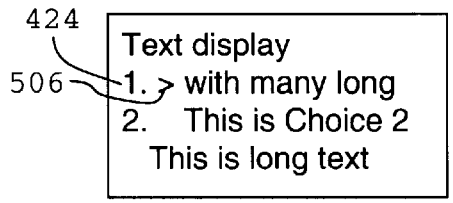
*Fig. 5A*　　　　　　　　*Fig. 5B*
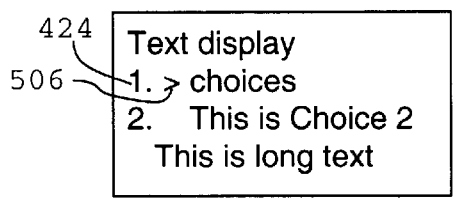
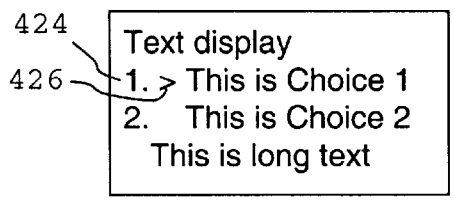
*Fig. 5C*　　　　　　　　*Fig. 5D*
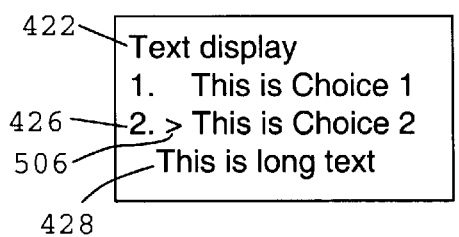
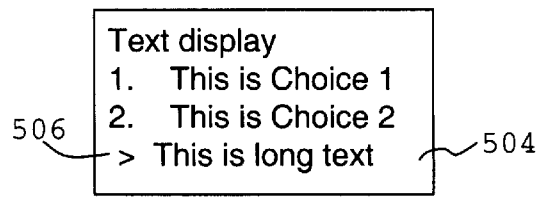
*Fig. 5E*　　　　　　　　*Fig. 5F*

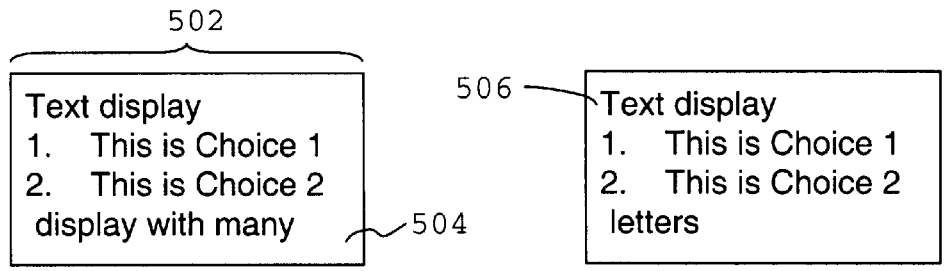
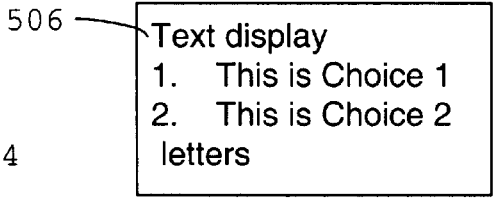
*Fig. 5G*  *Fig. 5H*
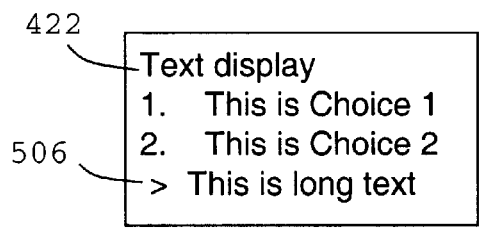
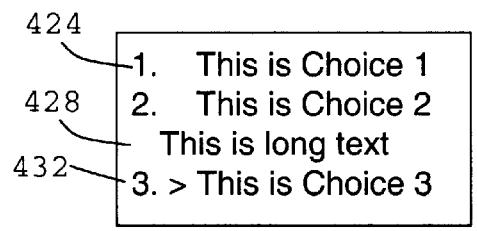
*Fig. 5I*  *Fig. 5J*
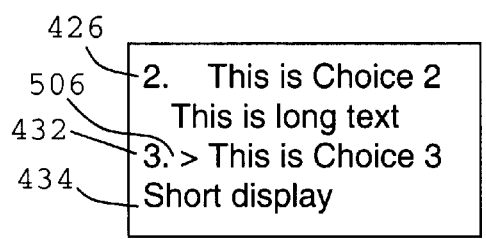
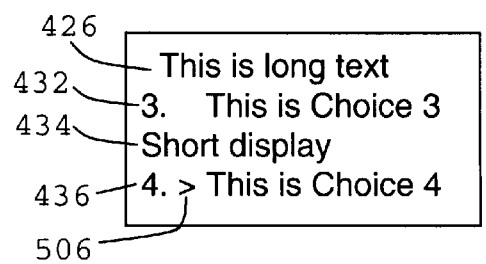
*Fig. 5K*  *Fig. 5L*

METHOD FOR DISPLAYING SELECTABLE AND NON-SELECTABLE ELEMENTS ON A SMALL SCREEN

CROSS-REFERENCE TO RELATED APPLICATION

This application is a continuation-in-part of pending U.S. patent application Ser. No. 08/815,646, now pending, entitled "METHOD OF DISPLAYING ELEMENTS HAVING A WIDTH GREATER THAN A SCREEN DISPLAY WIDTH", filed on Mar. 03, 1997, by Alain S. Rossmann, one of the co-inventors hereof.

BACKGROUND OF THE INVENTION

1. Field of the Invention

This invention relates generally to the display of information on small display screens, and in particular to methods for displaying structured information comprising selectable and non-selectable elements, wherein some of the selectable elements have a width greater than the screen display width.

2. Description of Related Art

Pocket size or mobile devices such as cellular telephones and pagers as well as desk-top telephones are now capable of receiving and displaying structured information that originates from outside of the device. Nowadays these devices usually have display screens with varying screen sizes and consequently varying screen display widths. Thus, an author of the structured information cannot customize the layout of the information for the screen size of a specific device because the screen size is device dependent.

In view of the variations in screen size among devices, prior art solutions for displaying structured information have attempted to enable a user adapt to the information being received and to display the information in a way that makes the information usable to the user.

Currently, there are three alternative solutions to the problem of displaying text which exceeds the width of a small screen display such as those on cellular telephones or pagers. In a first method, if the text of an element 110 is longer than screen display width 101, the text is wrapped and made to flow down a display screen 125 as illustrated in FIG. 1A. In FIGS. 1A to 1D, a rectangle 108 defined by the solid lines represents display screen 125. The other elements in the structured textual information are shown simply to provide context for the following description.

In this method, the elements that do not fit on display screen 125, e.g., choices 111 to 113, are clipped and can be accessed by scrolling down vertically. This is similar to the method used by computer word processors for example. The fact that the text is structured into four elements 110 to 113 is not considered in displaying the text. Elements 110 to 113 are considered one continuous text message.

The vertical scrolling can be one line at a time, one screen display at a time (See the discussion of FIGS. 3A to 3D below), or a fraction of a screen display at a time. In this example, one line is scrolled at a time so after a scroll operation, display screen 125 is as shown in FIG. 1B. The user sees a portion of element 110 and a portion of element 111. FIG. 1C illustrates display screen 125 after another one line scroll operation. FIG. 1D illustrates display screen displaying the fourth test element 113 which would be obtained by many one line scroll operations from the state of the display screen 125 in FIG. 3C.

As illustrated in FIGS. 1A to 1D, at any instant, the user is not able to view even a portion of all four of the choices in the list on display screen 125. In this embodiment, with a four-line display screen, the user can view at most one complete selectable element or choice. The user must scroll vertically to see the other selectable elements or choices. This makes it very hard for the user to remember what the choices are available, particularly after the user has to perform various scrolling operations to see other choices.

A second display method has been to display a message with multiple lines as a single line and automatically scroll the resulting single line horizontally across the screen display. This is similar to the way one line of information is displayed for example on Times Square in New York City.

The second method, where the text is fit on one line and scrolled horizontally, would not be at all suitable for the example discussed above with reference to FIGS. 1A to 1D. Scrolling the concatenated text of the four choices on one line, as illustrated in FIG. 2, would make the devices with small screens unusable for the user.

A last display method used is a hybrid of the two methods described above. Text is wrapped on the screen display and after a short pause, long enough for the text to be read, the text automatically scrolls vertically, usually a full screen display at a time. This display method is illustrated in FIGS. 3A to 3D where each element is displayed individually in this example.

The last method has the same pitfalls as the first method. In particular, the user is able to see only one choice at a time. The fact that the screen display scrolls automatically to the next screen display makes it harder for the user to remember the choices as the automatic scroll can occur before the user has had time to understand the choices presented to him or her.

The three scrolling methods described above are well suited to the display of unstructured textual information such as a text message. They are often used in pagers or cellular telephones that support paging.

However, as illustrated above, the methods do not work well for structured elements, such as those in a list of user choices, a menu of user options, or a list of data that are presented on a display screen which is too small to display all of the structured elements in their entirety. In each of the methods discussed above, although structured information could be used, the methods would simply process the structured information as one continuous string of text without regard to the elements within the structure.

Presenting a structured list on a small display screen presents many unresolved challenges. The reason this problem has not been solved is that up to now devices with a small display such as pagers or cellular telephones either displayed information that had been preprogrammed into the device, or displayed non-structured textual information. In the case of information that had been preprogrammed and designed into the device, such as a menu of choices pertaining to the configuration of the device, the developers who programmed these menus made sure that the information had been optimized to the device and chose the wording to make sure that the choices fit within the width of the screen display.

When information originates outside of the device, only the case of non-structured information has been implemented and the methods described above are used with good results. When structured information originates outside of the device and is meant to be displayed on devices with various display screen sizes, there has been no efficient way to layout, i.e., preprogram, the information for a particular screen display size.

Thus, a solution of the problems associated with displaying structured information on small display screens is needed before structured information, such as a list of choices and long texts (selectable elements) and short text (non-selectable elements), can be advantageously used on telephones, cellular telephones, pagers and other devices with small display screens.

SUMMARY OF THE INVENTION

According to the principles of this invention, a structured screen display process presents structured information that includes a plurality of elements on any width screen display so that the user is able to see as many of the elements as possible at once, and is able to see the complete text of any element as needed. The process of this invention dynamically adapts the display of structured information to the width of the screen display. Further, with this dynamic adaptation, the user is able to see at a glance as many as possible of the elements of the structure and read any one of the elements at the user's discretion in a way that is compatible with using the structured information such as a list of selectable elements along with non-selectable elements.

In one embodiment of the method of this invention, structured information is presented on a screen display by displaying at least a portion of each selectable element in a plurality of selectable and non-selectable elements on the screen display where at least one of the selectable elements has a width greater than a width of the display screen. The at least one element is scrolled in a predefined direction, e.g., horizontally, while continuing to display the portion of each other element in the plurality of elements.

BRIEF DESCRIPTION OF THE DRAWINGS

These and other features, aspects, and advantages of the present invention will become better understood with regard to the following description, appended claims, and accompanying drawings where:

FIGS. 1A to 1D illustrate a first prior art solution for displaying structured information on a small display screen;

FIG. 2 illustrates a second prior art solution for displaying structured information on a small display screen;

FIGS. 5A to 5L illustrate the screen displays for the structured information of FIG. 4B according to the principles of the present invention where structured information is displayed on a display screen so that the user is able to see as many of the structure elements as possible at once, and is able to see the complete text of any element when needed;

NOTATION AND NOMENCLATURE

Figure 3A:
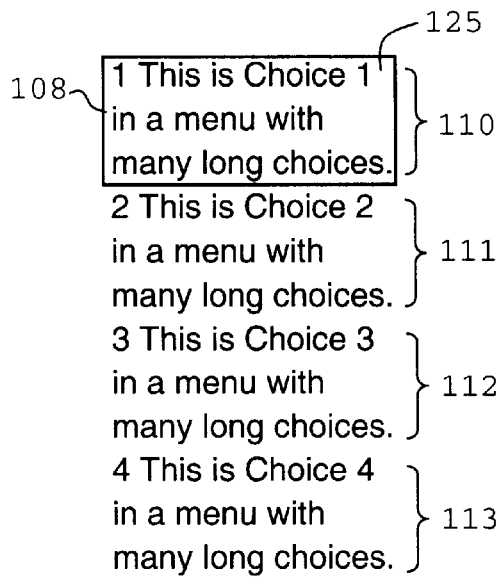
FIGS. 3A to 3D illustrate a third prior art solution for displaying structured information on a small display screen.
Figure 3B:
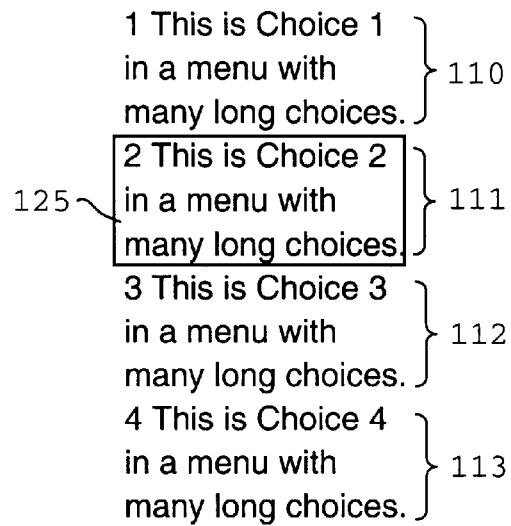
Figure 3C:
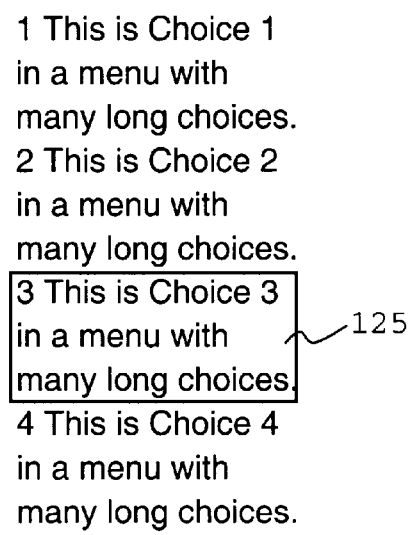
Figure 3D:
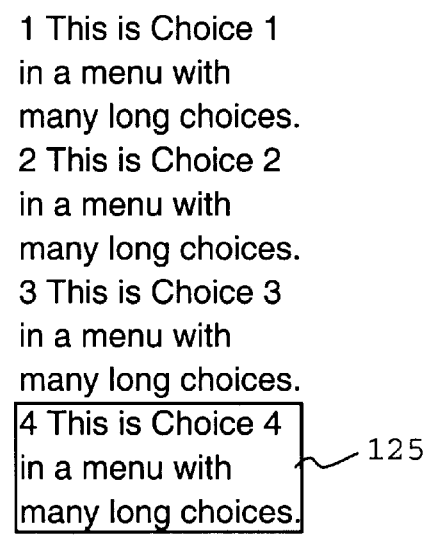

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble of data processing devices including two-way communication interactive devices such as mobile phones, two-way pages, telephones and remote controller with Internet connections. These process descriptions and representations are the means used by those experienced or skilled in the art to most effectively convey the substance of their work to others skilled in the art. The present invention is a method for display selectable and non-selectable elements on a small screen. The method to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

DETAILED DESCRIPTION

According to the principles of this invention, a structured screen display process that concurrently displays as many of the elements as possible at once on a display screen, and allows the user to see any element completely when needed. Herein, a structured screen display is composed of individually identifiable elements. FIG. 4 illustrates a representative structured screen display comprising selectable elements 402, 404, 406, 408, 412 and 414 and non-selectable elements 402 and 416. Element 402 is a piece of long textual information and the width thereof is greater than a width of the display screen. A typical LCD display screen in a cellular phone is four lines high by twenty characters wide, which means element 402 will have to be displayed partially without obscuring other elements. As one of the important features in the present invention as to be described more below, element 402 is made a selectable element as such a first portion of the element is displayed and the rest of the element can be displayed when the element is selected.

Selectable elements 404, 406, 408, 412 and 414 form a menu of choices or a list of user options. Although not a requirement, any of these selectable elements 404, 406, 408, 412 and 414 may constitute another structured screen display that may further comprise a list of user options. For example, a list of US news items will be displayed if a choice to "US News" 404 is made by the user. Non-selectable elements 410 and 416, often used to get immediate attention of a user, are only for display purpose and have no further links to any other structured screen display.

Figures 4A, 4B:
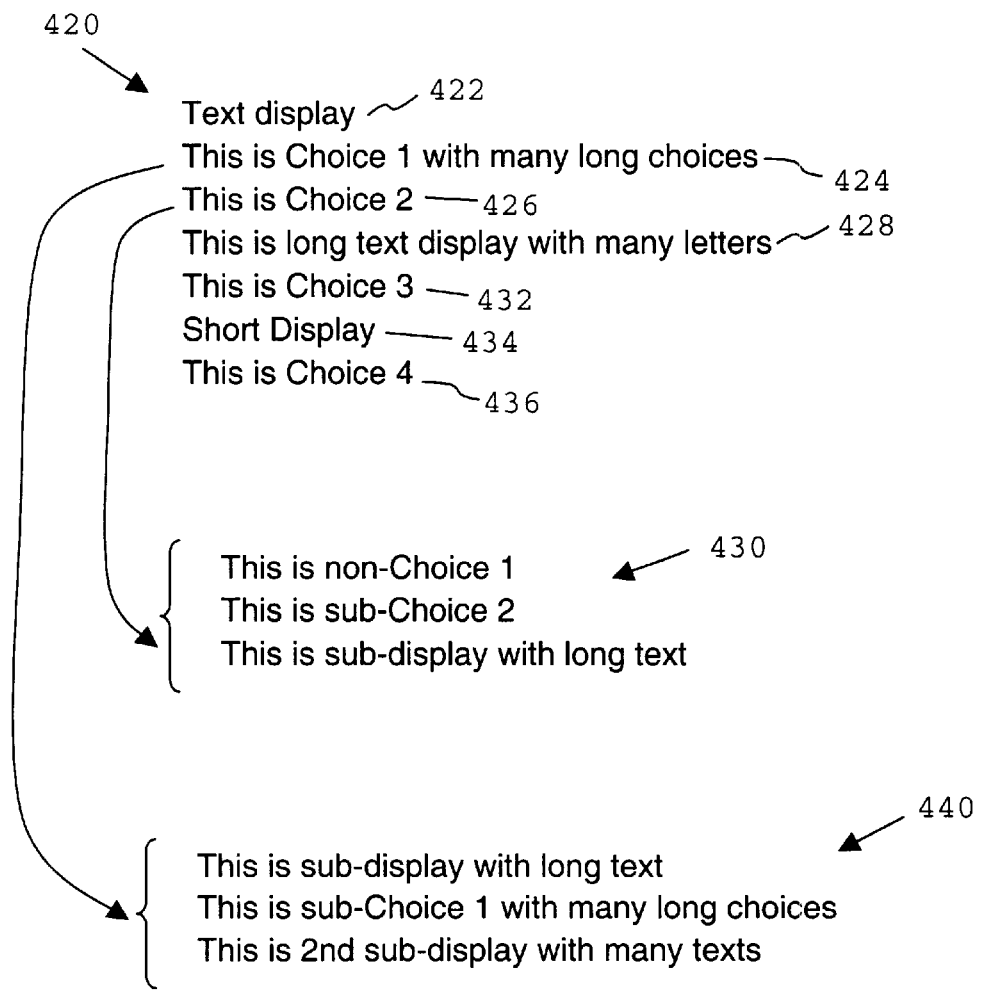
FIG. 4A shows a representative example of screen display including selectable and non-selectable elements.
FIG. 4B shows exemplary structured information used in describing the present invention, the exemplary screen display includes selectable and nonselectable elements, some of the selectable elements further including sub-structured information.

To facilitate the description of the present invention, an exemplary structured screen display 420 is illustrated in FIG. 4B in which there are four selectable elements 424, 426, 428, 432 and 436 and two non-selectable elements 422 and 434. It should be understood that element 428 is a long text, like element 402 of FIG. 4A, it is made a selectable element although it is not a choice in a menu. Further shown in FIG. 4A are two sub-structured screen displays 430 and 440 that are caused to be displayed respectively when selectable element 424 and 426 are respectively chosen. Sub structured screen displays 430 and 440 further have selectable elements and non-selectable elements. It is understood to those skilled in the art that in one embodiment information originated outside of a device is generally managed in a structure like an upside-down tree; each node is referenced by a choice expressed in a selectable element and the leaves hold the actual information that may be either selectable or non-selectable elements.

FIGS. 5A to 5L demonstrate a sequence of display screens for the exemplary structured screen display 420 as above. According to the principles of this invention, elements 422, 424, 426 and 428 are respectively displayed on one display line of display screen 504 that can support four display lines. As used herein, a display screen is the physical display apparatus in a device, such as a 4 by 20 character LCD screen. A screen display is the image presented on the display screen. On displays with a limited number of lines, one line for each element is the most often chosen implementation. However, the use of one line for each element is only illustrative of the principles of this invention and is not intended to limit the invention to this particular embodiment. Alternatively, each element could be displayed on two or more lines without affecting the principles of this invention. Further it is understood that display screen 504 having four display lines is only for illustrative purpose and many display screens in reality do not necessarily have distinct display lines and it will be appreciated that the principles of this invention are equally applied thereto.

As shown in FIG. 5A, the length of element 424 and 428 exceeds width 502 of display screen 504, the display of elements 422 and 428 is clipped and only as many characters of each element as fit width 502 of display screen 504 are visible in FIG. 5A. In this embodiment, the element is clipped at a word boundary, i.e., a sub-element boundary, so that partial words are not displayed.

According to one embodiment of this invention, the first selectable element is selected when a screen display is first displayed. Therefore, element 424 of displayed elements 422, 424, 426 and 428 is selected as indicated by an element selection character or element indicator 506. It is understood that the first selectable element being selected is up to an implementation preference. An important aspect of the invention is that only one selectable element can be selected at a time.

In this embodiment, a selected element is visually indicated to the user by element indicator 506 that is placed after the numeric label "1" indicating that it is the first choice in the menu in structured screen display 420 for that element. However, any other method, such as inverse image or video, a different element selection character, or the position of the element being always at the top or bottom of the display, could be used to indicate the specific element selected without having an impact on the operation of this invention.

The user can select a different element by vertically scrolling element indicator 506 up or down. The specific method used to move element indicator 506 up or down on display screen 504 is not an essential feature of this invention. In view of this disclosure, those skilled in the art can implement the invention with any desired mechanism for moving element indicator 506. For example, a thumb wheel, a mouse, or a rocking controller, as available in some video game machines, would work equally well as those mechanisms for scrolling element indicator 506.

Independent of the method used to move element indicator 506, when a specific element is selected, the information in the selected selectable element is automatically scrolled horizontally in a predefined manner. In this embodiment, as illustrated in FIGS. 5B and 5C, selected selectable element 424 scrolls one screen display width at a time aligned on word boundaries after a pause that is long enough for the user to read the newly visible text while the rest of the displayed elements 422, 426 and 428 remain unchanged. Herein, aligned on word boundaries means that after a horizontal scroll, the leftmost visible word of the scrolled element is the first word that was not visible before the scroll. In this embodiment, selected element 424 keeps scrolling after each pause until the complete element has been displayed to the user. In one implementation, the method scrolls through the entire element three times to make sure the user has ample time to read the selected element.

As illustrated in FIGS. 5A to 5D for the case of a long selectable element, which is often labeled with, for example, a numeral, neither the label nor selected indicator 506 scrolls. This helps the user preserve context, and link the newly visible text as belonging to the selected and now scrolling choice. However, even without preserving the context of a particular choice, the novel principles of this invention are a significant enhancement over the prior art methods that are problematic in the display of structured information.

In this embodiment, when structured information is first displayed on display screen 504, first selectable element 424 of the structured information is selected and starts horizontal scrolling automatically. The system could optionally only trigger horizontal scrolling upon a user action, such as changing the selection without affecting this invention.

FIG. 5E shows what happens when a user scrolls vertically down to select a next selectable element rather than the pre-selected first element. As there are two selectable elements 424 and 426 displayed in display screen 504, scrolling downward one element causes element indicator 506 to move from element 424 to element 426. There is no horizontal scrolling as selected element 426 is entirely displayed.

If the user further wants to move element indicator 506 one more element downward to element 428, FIG. 5F shows that element indicator 506 now points to selectable element 428 that is a long text. It is noted that elements that have been displayed remain the same and there is one selectable element 428 available for element indicator 506 to indicate a selected element. As indicated that selectable element 428 is a long text whose width is greater than screen width 502. A first portion of the element is displayed first as shown in FIG. 5F. According to one embodiment, the first portion is displayed for approximately 1.5 seconds and a second portion is displayed for 1 second using the word boundaries as shown in FIG. 5G, with the rest of the displayed elements unchanged. Before the first portion of element 428 is displayed again, it is examined that if there are any more portions that element 428 may have. If there are more portions to be displayed, all the portions are respectively and sequentially displayed for the same duration, i.e. to allow the user to read the portions. FIG. 5H shows that a third portion of element 428 is displayed with the rest of the displayed elements unchanged. Further it is noticed that element indicator 506 is no longer displayed when the second and third potions of long element 428 are respectively displayed on display screen 504 at the word boundary. The suppression of element indicator 506, when other than the first portion of a selectable long text element is displayed, is to leave an impression to the user that the selected element is not a choice in a menu, there is no sub-structured information linked thereto, thus no further activation is needed or permitted. This is an important distinction from displaying a long choice, such as selectable element 424. FIG. 5I shows that the first portion is returned after the last portion of element 428 is displayed. It is noted that element indicator 506 is now displayed again with the first portion, the user thus knows where a selection has been made.

To further scroll downward, FIG. 5J shows that the original element, non-selectable element 422 has been scrolled out of display screen 504 and a new selectable element 432 has scrolled in and thus displayed. This has to happen because there was no selectable element available in display screen 504 for element indicator 506 to point to. It is also noted that the first potion of selectable element 428 is displayed and remains displayed, no horizontal scrolling happens because element 428 is not selected now. If the user wants to move to the next selection, element indicator 506 is intended to move to next selectable element. Because element 434 is not a selectable element and a selectable element must be in display screen 504 in order to be selected, FIG. 5K shows that another element 434 joins in display screen 504 and pushes element 424 out of display screen 504. It is noted, however, that newly displayed element 434 is a non-selectable element. To indicate that element indicator 506 only points to a selectable element, element indicator 506 in FIG. 5K remains pointing at selectable element 432. It is understood to those skilled in the art that maintaining an element indicator at only selectable elements is not a requirement in the present invention. The element indicator could, for example, be implemented to point to every single element regardless it is a selectable or non-selectable element.

Further to scroll element indicator 506 down one element causes a selectable element 436 to move in and selectable element 426 move out display screen 504. Because element 436 is selectable, element indicator 506 now points at newly displayed selectable element 436. From FIGS. 5J to 5L, element indicator 506 moves from one selectable element to the next selectable element, while skipping non-selectable elements.

FIGS. 5A to 5L show a sequence of displaying selectable and non-selectable elements, wherein some of the selectable elements have a width greater than the screen display width. One of the advantages in the present invention is that is allows the user to see as many of the structure elements as possible at once and to see the complete text of any element when needed. When a selected selectable element has a width greater than the screen display width, the selected long element is completely displayed by horizontally and cyclically displaying portion after portion of the selected long element. The exact timing and speed of the horizontal scrolling of the selectable long element can vary widely. These timings and speeds are a matter of preference and can be customized to increase user comfort. The number of times of processing scrolling the complete element can be changed to any number of repetitions without affecting the operation of this invention.

It is important to note that because structured information is being displayed, and because this invention makes use of the concept of a selected element within the structured information, it is the user's action of scrolling to an element and selecting that element which triggers the horizontal scrolling. This is an important difference from the prior art scrolling methods described above which assumed that the displayed text had no structure.

In one embodiment of this invention, the structured screen display process is included in a plurality of methods that are executed on a processor within a portable hand-held device. Other methods performed by the portable hand-held device are not essential to this invention and so are not considered further. In view of the following disclosure, those skilled in the art can integrate the structured screen display method of this invention into the device so that the method is performed at the appropriate time. For example, the method of this invention could be implemented with the client module described in and commonly assigned U.S. patent application Ser. No. 08/570,210 entitled "METHOD AND ARCHITECTURE FOR AN INTERACTIVE TWO-WAY DATA COMMUNICATION NETWORK" of Alain Rossmann, one of the inventors hereof, which is incorporated herein by reference in its entirety. The client module included a plurality of manager modules including a navigation manager module, a network manager module, an HDMI, manager module, an archive manager module, a local manager module, an event manager module, a timer manager module, a user interface manager module, a memory manager module, and a device dependent module, wherein HDML stands for Handheld Device Markup Language that was previously referred to as TIL (terminal interaction language).

Figure 6A:
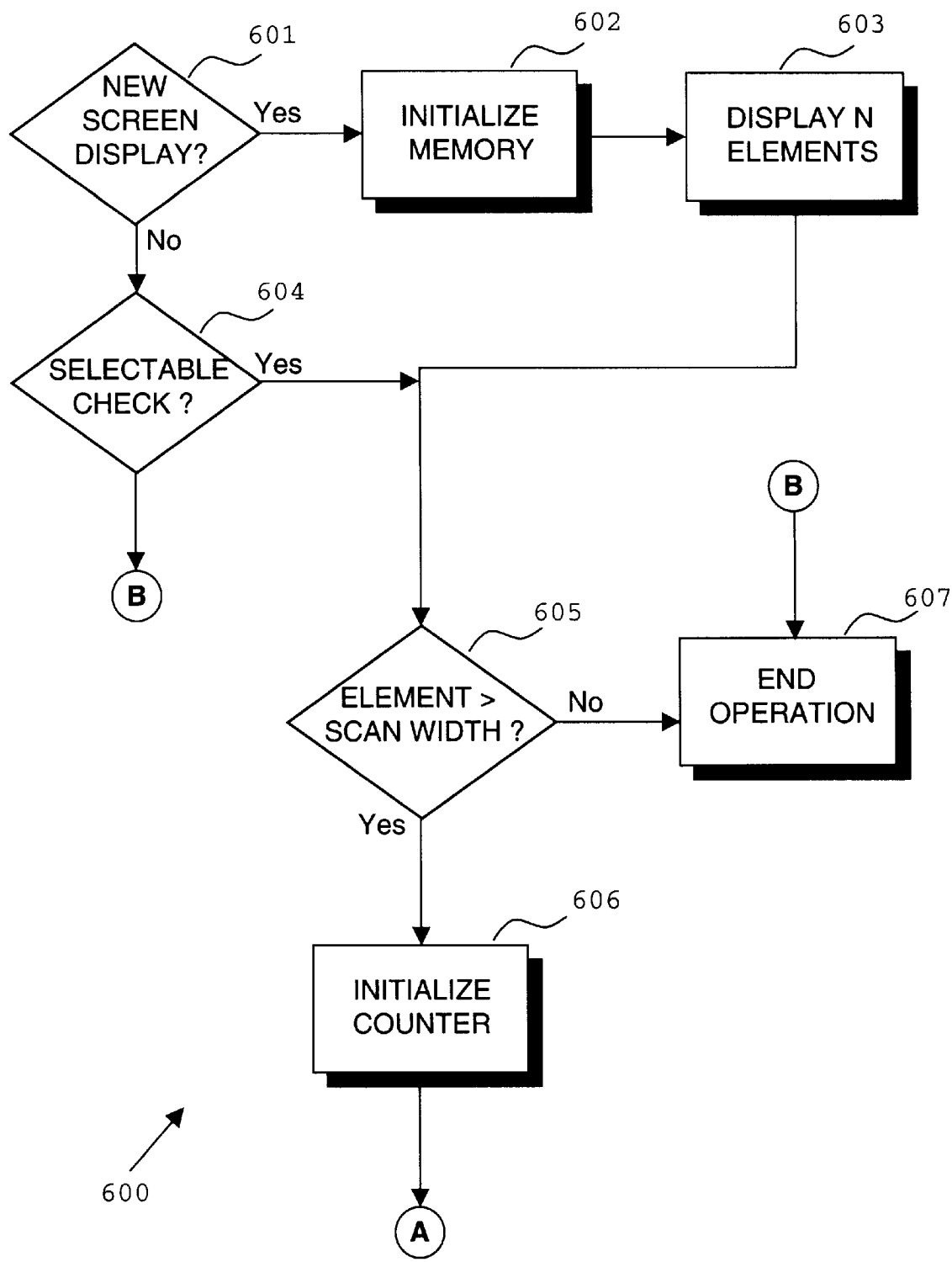
FIGS. 6A and 6B illustrate a process flow diagram for one embodiment of the structured display process of this invention.
Figure 6B:
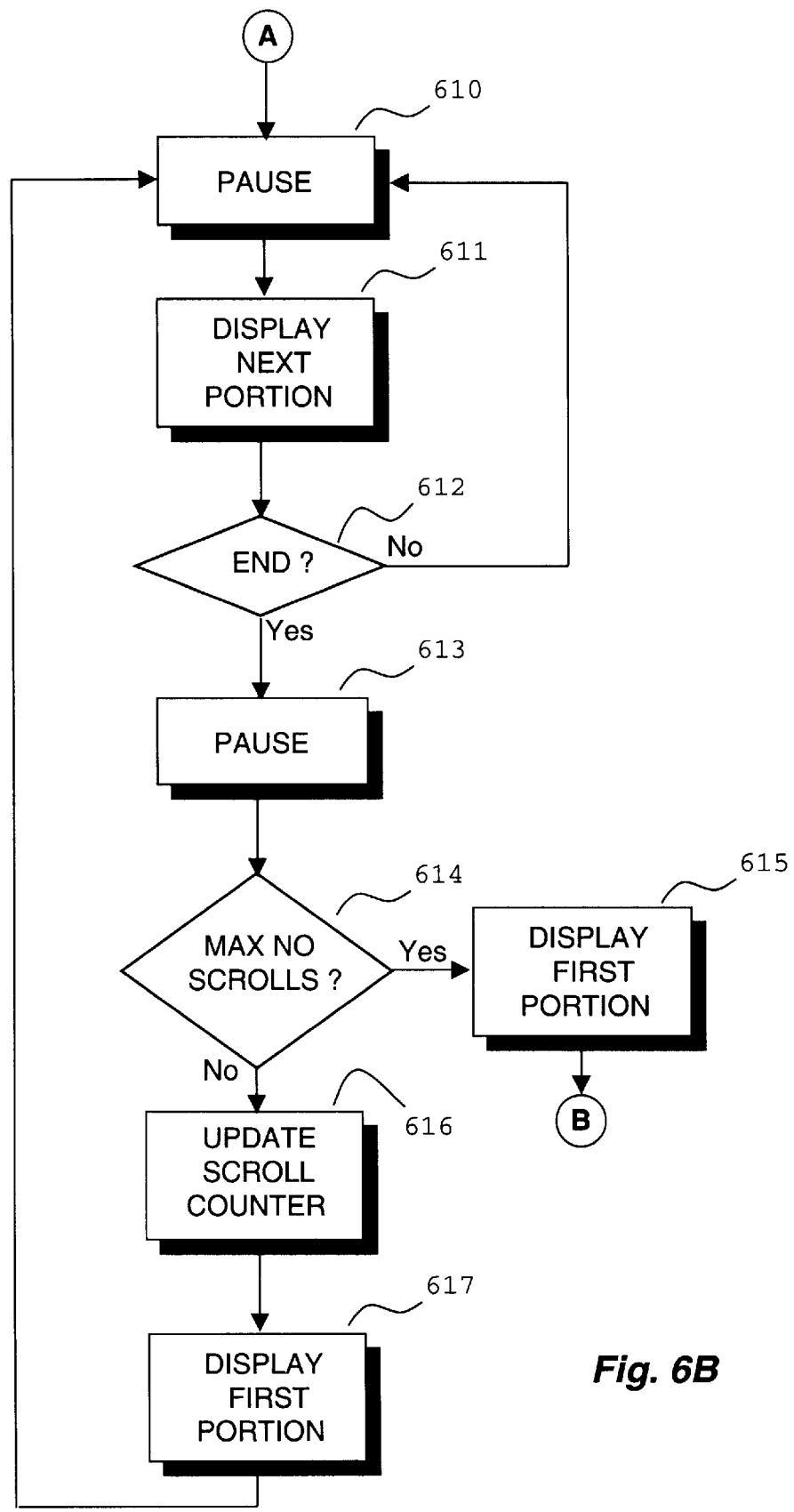

FIG. 6 shows a process flow diagram for one embodiment of the structured display process of the present invention and shall be understood in conjunction with FIGS. 5A to 5L and FIG. 7 that illustrates a screen buffer memory layout. According to one embodiment, there are two events that can initiate structured screen display method 600 of this invention. A first event is display of a new screen, meaning that new structured information is loaded up for display at a display screen, and a second event is activation of an element selection character key by the user. The element selection character key is a key in a key in a keypad that is designated to move the element indicator up and down. Typically a pair of arrow keys (up and down) in a keypad on a cellular phone are designated to be the element selection character key or the element selection character key sometime is implemented as a soft key displayed in a display screen. It is assumed herein that if the user holds the element selection character key depressed, the screen display is scrolled from element to element until the user releases the element selection character key to select a particular element.

The event generated by release of the element selection character key includes identification of a particular selectable element selected by the user. The horizontal scrolling automatically occurs when the selected selectable element has a width greater than the display screen width. Of course, if the number of elements in the structured screen display is greater than the number of elements that can be displayed at one time on screen display 504, as element indicator 506 is moved to selectable elements that are not displayed, the screen display is vertically scrolled to show the element on which element indicator 506 is currently located. Vertical scrolling of information on a screen display to maintain display of a pointer is well-known to those of skill in the art and so does not form an essential aspect of this invention.

Hence, in structural display method 600 (FIGS. 6A and 6B), a structured screen display event handler within an event manager first checks in new screen display event check 601 whether the current event is a new screen display. If the current event is a new screen display, check 601 transfers processing to initialize memory operation 602.

Figure 7:
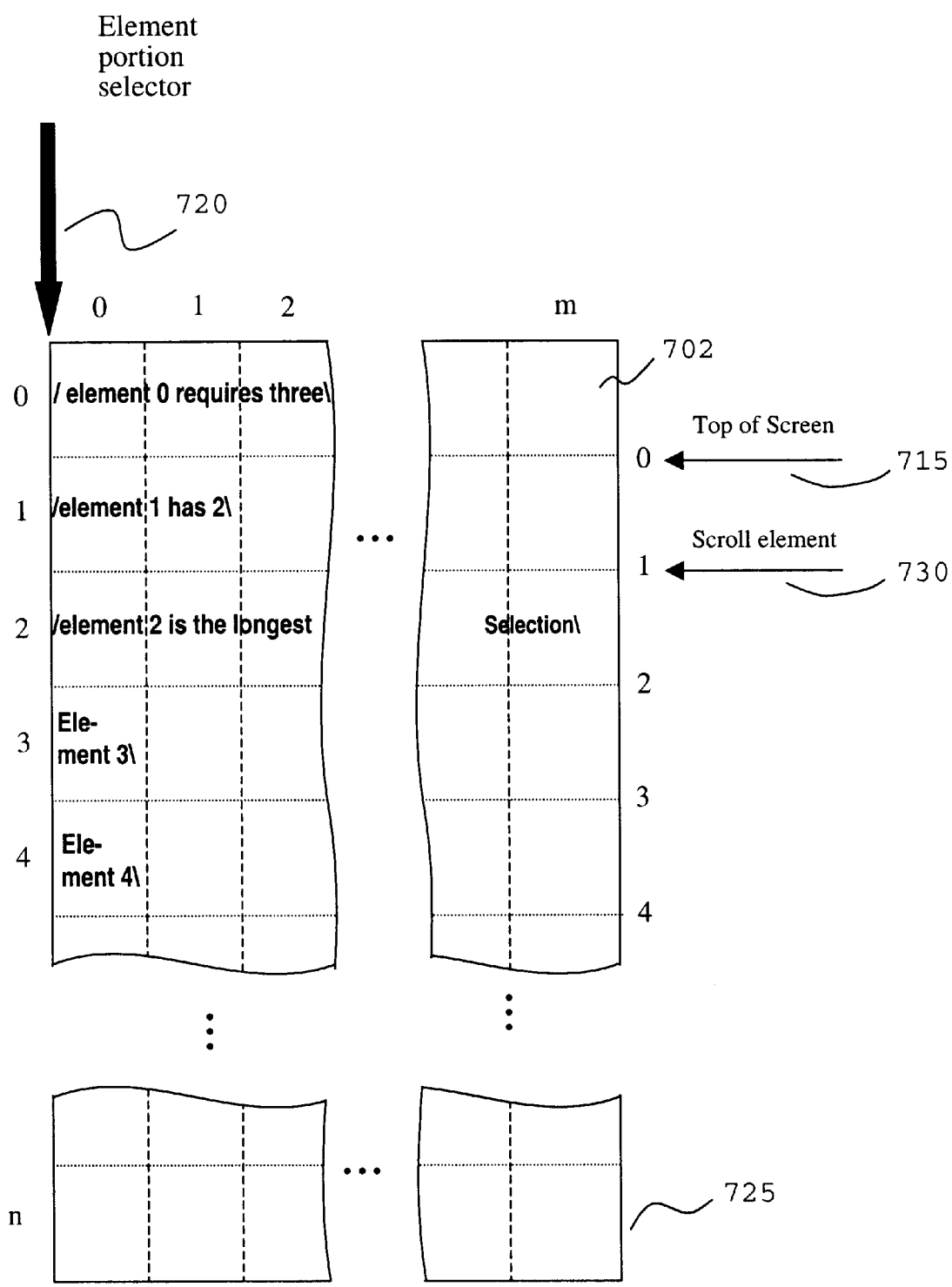
FIG. 7 illustrates one embodiment of the pointers and the relationship of the pointers to structured information stored in a buffer memory as used by the structured display process of this invention.

In one embodiment of initializing memory operation 602, each storage location, such as 702, in a screen display buffer memory 725 as shown in FIG. 7 is set to a predefined value, e.g. a negative number or perhaps, an illegal value, that is used to define the end of each element for the screen display. Screen display buffer memory 725 can be configured using RAM (random-access memory). Alternatively, each element can include an end-of-element character to indicate the end of the element. In either case, the elements for the screen display are stored in screen display buffer memory 725 for subsequent displays.

In this example, a back slash is used as the end-of-element character and a slash preceding an element indicates the element is selectable. Also, in FIG. 7, dashed vertical lines are superimposed on the memory to illustrate the screen display width. Memory 725 is illustrated therein as a layout to demonstrate how the structured information is accessed for display in a display screen with a limited size according to one embodiment. Thus, element 0 is stored as three sub-elements where each sub-element is the information that can be displayed at one time on the display screen. The sub-elements with element 0, as represented in FIG. 7, are stored in locations (0,0), (0,1) and (0,2) of memory 625, where the first number in a pair represents the element, and the second number in the pair identifies the sub-element of that element.

The concept of storing sub-elements is for illustration purposes only. Typically, an element is simply stored in contiguous memory locations. The important aspects are that a word or other part of an element is not broken across two screen displays, and a mechanism is provided to horizontally scroll an element. The use of sub-elements is intended only to assist in the visualization of this process. In this embodiment, an element portion selector 720 is used to identify the start of the next screen display within an element while width 502 of screen display 504 is known so that the appropriate portion of an element can be displayed properly during horizontal scrolling of that element. It is understood to those skilled in the art that element portion selector 720 is an address pointer from a counter controlled by an oscillating circuit.

Storage of elements in contiguous locations of buffer memory 725, as illustrated in FIG. 7, is only for ease of illustration of the principles of this invention. The particular technique used to store the elements, that are displayed on screen display 504, is not an essential aspect of this invention.

Element 1 requires two screen display widths and is shown stored in memory 725 at locations (1,0) and (1,1). As illustrated in FIG. 7, each element can be up to m screen display widths wide where m is selected by the application programmer. It can be appreciated that the value of m is only limited to the capacity of memory 725 and typically m is chosen around 5, otherwise a long selectable element would be preferably reworded to practically fit in a few display lines. Also, as illustrated in FIG. 7, buffer memory 725 is n elements deep.

A top of screen pointer 715 is used to indicate the element currently displayed in the top position on screen display 504. For the position of pointer 715 illustrated in FIG. 7, a four line screen, and one element per line, elements 1 through 4 are displayed on screen display 504 and element indicator 506 is positioned on element 2 as indicated by scroll element pointer 730 that corresponds to the position of element indicator 506 on screen display 504.

In initializing memory operation 602, top of screen pointer 715 is initialized to point to element zero, and element indicator 506 is initialized to element zero by setting scroll element pointer 730 to zero. In operation 602, element portion selector 720 is also set to point at the start of element zero. Thus, operation 602 not only stores the structured information that is displayed but also initializes pointers associated with scrolling and positioning of information on screen display 504.

After the elements are stored in memory 725 and the various pointer initialized in operation 602, the first N elements are displayed in display N elements operation 603. In this embodiment, N is an integer that is defined as:

N=(Number of Screen lines)/(Lines per element).

If any of the first N elements has a width greater than screen display width 502, only a first portion of the element is displayed, e.g. for text, a first t characters or less where t is the maximum number of characters that can be displayed on a line. In this embodiment, a word is not split, no partial word is displayed. Display first N elements operation 603 transfers to element greater than screen display width check operation 605.

If the event that initiates method 600 is activation of element selection character key, selectable check 604 determines if an element to be displayed is selectable or non-selectable by examining the first character. If there is no special character, such as a slash, it means the element is non-selectable and proceeds to display the element. If there is a special character that indicates that the element is selectable, selectable check 604 transfers processing to element greater than screen display width check operation 605 along with a value of scroll element pointer 730.

In this embodiment, as described above, scroll element pointer 730 indicates the position of element indicator 506 on screen display 504 and top of screen pointer 715 identifies the storage location in memory 725 of the first element displayed. Thus, the element that is considered for horizontal scrolling is located in memory 625 at the sum of top of screen pointer 715 and scroll element pointer 730.

If an element greater than screen display width 502, the first portion of the first element, which in this example is the portion stored at position (0,0) in FIG. 7, is tested to determine whether the end-of-element character is included in the first portion. If the end-of-element character is not included in the first portion, the first element, e.g., element zero, displayed on screen display 504 has a width greater than screen display width 502, and so check 605 sets element portion selector 620 to point at the start of a second portion of the element. Check 605 transfers processing to initialize counter operation 606.

Conversely, if the end-of-element character is included in the first portion, the first element, i.e., element zero, has a width less than screen display width 502 and so no horizontal scrolling is required. In this case, check 605 transfers to end operation which performs any necessary clean-up and displays and returns control to the event manager.

In one embodiment, an element is horizontally and cyclically scrolled. In another embodiment, an element is horizontally scrolled a predefined number of times. The predefined number of times is selected to facilitate the user seeing the entire element enough times that the user associates the information with the particular label for that element. Typically the predetermined number of times is three. Thus, for this embodiment, initialize counter 606 sets a horizontal scroll counter to three and transfers processing to pause operation 610. Of course, if it is unnecessary to repeat the horizontal scrolling a predefined number of times operation 606 and maximum number of scrolls check 614, that is described more completely below, could be eliminated.

As indicated above, each portion of the selected element is displayed for a predefined time period that is long enough for the user to easily read the newly visible portion of the selected element. Thus, pause operation 610, and pause operation 613 that is described below, are simply time delays for the predefined period. In this embodiment, the time delay implemented in pause operations 610 and 613 is the same for each portion of the element. In each instance, pause operation 610 transfers processing to display next portion operation 611.

However, implementations that provide varying delays for horizontal scrolling through the portions of the selected element, or differing delays for different horizontal scrolls through an element are also within the scope of this invention. For example, a first pause flag could be set upon entry to method 600. In pause operation 610, when the pause flag is set, a longer pause is used for the first portion displayed to allow the user to decide whether to select an element other than the first element displayed for horizontal scrolling. The first entry to pause operation 610 clears the pause flag. Also, the user may not require as much time to read the selected element on the final horizontal scroll of that element. Thus, pause operation 610 could use the value of the horizontal scroll counter to select a particular time delay.

Display next portion operation 611 displays the portion of the element starting at the location of element portion selector 720, and transfers to end-of-element check operation 612.

End-of-element check operation 612 tests the portion, that is stored at position (0,1) in FIG. 7, to determine whether the end-of-element character is included in the second portion of the element. If the end-of-element character is not included in the second portion, the first element displayed in screen display 504 has a width greater than twice the screen display width, and so check sets element portion selector 620 to point at the start of a third portion of the element. Check operation 612 transfers processing to pause operation 610 when the current displayed portion of the selected element is not the last portion of that element.

When processing returns to pause operation 610, the next portion of the element is displayed for the predefined time and then processing again transfers to display next portion operation 611. Display next portion operation 611 displays the next portion of the element as identified by element portion selector 620, and transfers to end-of-element check operation 612. Operations 610 to 612 are repeated until end-of-element check operation 612 detects the end-of-element character and transfers processing to pause operation 613.

Conversely, if the end-of-element character is included in the second portion, the second portion has a width less than or equal to screen display width 502 and so the horizontal scroll of the selected element is complete. In this case, check 612 transfers to a second pause operation 613.

Upon entry to pause operation 613, the complete element has been displayed, but the last portion of the element was just displayed in operation 611. Consequently, pause operation 613 delays for a predefined time so that the user can comfortably read the last portion of the element, and then transfers processing to maximum number of scrolls check operation 614.

Maximum number of scrolls check operation 614 first sets element portion selector 620 to point at the start of the selected element. Check 614 tests the value of the horizontal scroll counter. If the value of the counter is not zero, in this embodiment, i.e., a second predefined value, the element has not been horizontally scrolled the maximum number of times, and processing transfers to update scroll counter operation 616. Conversely, if the value of the horizontal scroll counter is the second predefined value, the element has been scrolled the maximum number of times and processing transfers to update display operation 615. Update display operation 615 displays the portion of the element that is pointed to by element portion selector 720 and transfers processing to end operation 607, that was described above.

When the element has not been horizontally scrolled the predefined number of times, update scroll counter operation 616 changes the value of horizontal scroll counter to indicate that another horizontal scroll of the element has been completed. Update scroll counter operation 616 transfers processing to display operation 617. Display operation displays the first portion of the selected element and sets element portion selector 620 to point at the start of a second portion of the selected element and transfers processing to pause operation 610.

Operations 610 to 614 and 616, 617 are repeated until the element has been horizontally scrolled the maximum number of times. As indicated above, when this occurs check 614 transfers to display first portion operation 615 that in turn transfers to end operation 607.

Thus, according to the principles of this invention, structured information is displayed on a screen so that the user is able to see as many of the structure elements as possible at once, and is able to see the complete text of any element when needed. Consequently, structured information that is generated outside a device, such as telephones, pagers, cellular telephones and similar devices with a small screen, can be easily processed and displayed using the method of this invention. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A method for displaying structured information on a screen, said method comprising:

displaying on said screen a portion of said structured information, said portion comprising a number of elements included in said structured information, wherein at least one of said elements in said portion is a selectable element having a width greater than a width of said screen; and scrolling said selectable element automatically, in a predefined direction and when being selected, in such a manner that, at any given time only complete words in said selectable element are displayed while continuing to display but not scroll each other element in said portion.

2. The method as recited in claim 1, wherein said scrolling said selectable element comprises:

displaying a first portion of said selectable element for a first predefined time.

3. The method as recited in claim 2, wherein said scrolling said selectable element further comprises:

displaying a second portion of said selectable element for a second predefined time.

4. The method as recited in claim 3, wherein said scrolling said selectable element further comprises:

determining whether said selectable element includes more than one portion.

5. The method as recited in claim 1, wherein said method further comprises:

repeating said scrolling of said selectable element a predefined number of times.

6. The method as recited in claim 1, wherein said predefined direction is horizontal.

7. A method for displaying structured information on a screen, said method comprising:

displaying on said screen a portion of said structured information, said portion comprising a number of elements included in said structured information;

determining whether a width of said one element is greater than a width of said screen when said one element is selected; and scrolling, automatically and horizontally, said one element without scrolling each other element in said portion upon determining that said width of said one element is greater than said width of said screen.

8. The method as recited in claim 7 further comprising:

displaying each other element in said portion on said screen while horizontally scrolling said one element.

9. The method as recited in claim 8 further comprising:

repeating said scrolling of said one element a predefined number of times.

10. The method as recited in claim 9, wherein said scrolling of said one element further comprises:

displaying a first portion of said one element for a predefined time.

11. The method as recited in claim 10, wherein said scrolling of said one element further comprises:

determining a number of displayable parts in said one element.

12. The method as recited in claim 11, wherein said scrolling of said one element further comprises:

displaying, successively and respectively, each of said number of parts of said one element for a predefined time.

13. A method for displaying structured information on a screen, said method comprising:

receiving said structured information comprising a plurality of selectable and non-selectable elements, wherein said selectable elements include at least one of options and texts, said non-selectable elements include text entirely displayable at one time on said screen;

displaying a portion of said plurality of selectable and non-selectable elements on said screen; said portion including at least one of said selectable elements which is a long selectable element having a length greater than a width of said screen;

determining a number of displayable portions of said long selectable element based on said width of said screen after said long selectable element is selected; and scrolling, successively, respectively and repeatedly, each of said number of said displayable portions of said long selectable element without scrolling each other of said selectable and non-selectable elements.

14. The method as recited in claim 13, wherein each of said options comprises sub-structured information, and at least a portion of said sub-structured information is displayed when a corresponding one of said selectable elements is selected.

15. The method as recited in claim 13, wherein said determining said number of said displayable portions of said long selectable element comprises:

dividing said long selectable element into said displayable portions with respect to said width of said screen, said dividing occurring at a word boundary.

16. The method as recited in claim 15, wherein said scrolling, successively, respectively and repeatedly, each of said number of said displayable portions of said long selectable element comprises:

displaying a first portion of said displayable portions for a predefined time; and displaying each subsequent portion of said displayable portions, for a period slightly shorter than said predefined time.

17. The method as recited in claim 15, wherein said scrolling, successively, respectively and repeatedly, each of said number of said displayable portions of said long selectable element comprises:

displaying successively each of said displayable portions for a predefined time.

18. An apparatus for displaying structured information on a screen, said apparatus comprising:

a screen;

a memory for storing instructions executable by a processor as an application module;

a processor, coupled to said screen and said memory, capable of executing said instructions to said application module to perform operations of:

displaying on said screen a portion of said structured information, said portion comprising a number of elements, wherein at least one of said elements in said portion is a selectable element having a width greater than a width of said screen; and scrolling, automatically and in a predefined direction, said selectable element in such a manner that, at any given time only complete words in said selectable element are displayed while not scrolling each other element in said portion.

19. The apparatus as recited in claim 18, wherein said scrolling said selectable element comprises:

displaying a first portion of said selectable element for a first predefined time.

20. The apparatus as recited in claim 19, wherein said scrolling said selectable element further comprises:

displaying a second portion of said selectable element for a second predefined time.

21. The apparatus as recited in claim 20, wherein said scrolling said selectable element further comprises:

determining whether said selectable element includes more than one portion.

22. A computer product including instructions executable by a processor in a device with a display screen, said computer product comprising:

program code for displaying on said screen a portion of said structured information, said portion comprising a number of elements, wherein at least one of said elements is a selectable element having a width greater than a width of said screen; and program code for scrolling automatically, in a predefined direction said selectable element when selected, in such a manner that, at any given time only complete words of said selectable element are displayed while not scrolling each other element in said portion.

23. The computer product as recited in claim 22, wherein said program code for scrolling said selectable element comprises:

program code for displaying a first portion of said selectable element for a first predefined time.

24. The computer product as recited in claim 23, wherein said program code for scrolling said selectable element further comprises:

program code for displaying a second portion of said selectable element for a second predefined time.

25. The computer product as recited in claim 24, wherein said program code for scrolling said selectable element further comprises:

program code for determining whether said selectable element contains more than one portion.

26. The computer product as recited in claim 22 further comprises:

program code for repeating said scrolling of said selectable element a predefined number of times.

27. A computer product including instructions executable by a processor in a device with a display screen, said computer product comprising:

program code for displaying on said screen a portion of said structured information, said portion including a number of elements;

program code for determining whether a width of one of said elements is greater than a width of said screen when said one of said elements is selected; and program code for scrolling, automatically and horizontally, said one of said elements without scrolling each other of said elements when said one of said elements is greater than said width of said screen.

28. The computer product as recited in claim 27, wherein said program code for scrolling of said one of said elements comprises:

program code for displaying a first portion of said one of said elements for a first predefined time.

29. The computer product as recited in claim 28 further comprising:

program code for repeating said scrolling of said one of said selected elements a predefined number of times.

30. The computer product as recited in claim 28, wherein said program code for scrolling of said one of said elements further comprises:

program code for displaying a second portion of said one of said elements for a second predefined time.

31. The computer product as recited in claim 27, wherein said program code for scrolling of said one of said elements further comprises:

program code for determining a number of portions contained in said element.

32. The computer product as recited in claim 31, wherein said program code for scrolling of said one of said elements further comprises:

program code for displaying, successively and respectively, each of said number of portions of said element for a predefined time.

33. A computer product for displaying structured information on a screen, said computer product comprising:

program code for receiving said structured information comprising a plurality of selectable and non-selectable elements, wherein each of said selectable elements includes an option, said non-selectable elements include text entirely displayable at one time on said screen;

program code for displaying a portion of said plurality of selectable elements on said screen; said portion including at least one of said selectable elements which is a long selectable element having a length greater than a width of said screen;

program code for determining a number of displayable portions of said long selectable element based on said width of said screen after said one of said long selectable elements is selected; and program code for scrolling, successively, respectively and repeatedly, each of said number of said displayable portions of said long selectable element without scrolling each other element of displayed portions of said selectable and non-selectable elements.

34. The computer product as recited in claim 33, wherein said option comprises sub-structured information, and at least a portion of said sub-structured information is displayed when a corresponding one of said long selectable elements is selected.

35. The computer product as recited in claim 33, wherein said program code for determining said number of said displayable portions of said long selectable element comprises:

program code for dividing said long selectable element into said displayable portions based on said width of said screen, said dividing occurring at a word boundary; and program code for calculating said number of said displayable portions.

36. The computer product as recited in claim 33, wherein said scrolling, successively, respectively and repeatedly, each of said number of said displayable portions of said long selectable element comprises:

program code for displaying a first portion in said displayable portions for a predefined time; and program code for displaying each of subsequent portions of said displayable portions, for a period slightly shorter than said predefined time.

37. The computer product as recited in claim 33, wherein said scrolling, successively, respectively and repeatedly, each of said number of said displayable portions of said long selectable element comprises program code for displaying successively each of said displayable portions for a predefined time.

* * * * *